US011758072B2

United States Patent
Yamada (10) Patent No.: US 11,758,072 B2
(45) Date of Patent: Sep. 12, 2023

(54) DRIVER ASSISTANCE SYSTEM, DRIVER ASSISTING METHOD, AND NON-TRANSITORY STORAGE MEDIUM

(71) Applicant: TOYOTA JIDOSHA KABUSHIKI KAISHA, Toyota (JP)

(72) Inventor: Yukihisa Yamada, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 17/374,128

(22) Filed: Jul. 13, 2021

(65) Prior Publication Data
US 2022/0060604 A1 Feb. 24, 2022

(30) Foreign Application Priority Data
Aug. 20, 2020 (JP) ................................ 2020-139548

(51) Int. Cl.
*H04N 1/60* (2006.01)
*B60K 35/00* (2006.01)

(52) U.S. Cl.
CPC ........... *H04N 1/6027* (2013.01); *B60K 35/00* (2013.01); *B60K 2370/176* (2019.05); *B60K 2370/349* (2019.05)

(58) Field of Classification Search
CPC ...... H04N 1/6027; H04N 9/643; B60K 35/00; B60K 2370/349; B06K 2370/176;
(Continued)

(56) References Cited

U.S. PATENT DOCUMENTS

| 2009/0309972 A1* | 12/2009 | Tonokawa | G07C 5/0866 |
| | | | 348/148 |
| 2011/0063461 A1* | 3/2011 | Masuda | H04N 23/66 |
| | | | 381/94.1 |
| 2020/0195846 A1* | 6/2020 | Appia | G06T 3/0093 |

FOREIGN PATENT DOCUMENTS

| JP | 11-296785 A | 10/1999 |
| JP | 2013-080518 A | 5/2013 |

* cited by examiner

*Primary Examiner* — King Y Poon
*Assistant Examiner* — Michael L Burleson
(74) *Attorney, Agent, or Firm* — Sughrue Mion, PLLC (57) ABSTRACT

A driver assistance system has a periphery monitoring device, a drive recorder, and an illuminance detecting section. The periphery monitoring device includes an imaging section that is mounted at a vehicle and captures images of a vehicle periphery, a memory, a processor that is coupled to the memory and that serves as a color tone correction processing section that corrects color tone of an image captured by the imaging section, and a display portion that displays an image having color tone that has been corrected by the color tone correction processing section. The drive recorder includes the imaging section, the memory, the processor that serves as the color tone correction processing section, and a recording section that records an image having color tone that has been corrected by the color tone correction processing section. The processor is configured so as to, in case in which an illuminance that is detected by the illuminance detecting section at a time of imaging by the imaging section is less than a predetermined reference value, correct color tone of an image captured by the imaging section such that color tone correction that is executed for recording in the recording section is color tone correction that is dark as compared with color tone correction that is executed for display at the display portion, and, in a case in (Continued)

which the illuminance that is detected by the illuminance detecting section at the time of imaging by the imaging section is greater than or equal to the predetermined reference value, correct the color tone of the image captured by the imaging section such that color tone correction that is executed for recording in the recording section is color tone correction that is bright as compared with color tone correction that is executed for display at the display portion.

6 Claims, 9 Drawing Sheets

(58) Field of Classification Search
CPC ... B60R 2300/30; B60R 1/00; B60R 11/0211; B60R 2300/105; G07C 5/0841
See application file for complete search history.

DRIVER ASSISTANCE SYSTEM, DRIVER ASSISTING METHOD, AND NON-TRANSITORY STORAGE MEDIUM

CROSS-REFERENCE TO RELATED APPLICATION

This application is based on and claims priority under 35 USC 119 from Japanese Patent Application No. 2020-139548 filed on Aug. 20, 2020, the disclosure of which is incorporated by reference herein.

BACKGROUND

Technical Field

The present disclosure relates to a driver assistance system.

Related Art

A technique relating to a drive recorder that is mounted at a vehicle is disclosed in Japanese Patent Application Laid-Open (JP-A) No. 2013-80518 for example. To explain this briefly, in the technique disclosed in JPA No. 2013-80518, a camera is mounted at a vehicle, and a drive recorder records images of the periphery of the vehicle that are captured by the camera. The images recorded by the drive recorder are utilized, for example, in analyzing the cause of an accident or the like, and the like.

The objects that a user wishes to confirm differ from one another in displayed images for monitoring the periphery of a vehicle and in images that are recorded by a drive recorder, and therefore, the requisite color tones of the images also differ.

Thus, it is difficult to, by using images that are captured by a common imaging section, achieve both of two functions that are the function of displaying images of a color tone that is suitable for monitoring the periphery of a vehicle, and the function of recording images of a color tone that is suited to a drive recorder.

SUMMARY

An object of the present disclosure is to provide a driver assistance system that, by using images captured by a common imaging section, can achieve both of two functions that are the function of displaying images of a color tone that is suitable for monitoring the periphery of a vehicle, and the function of recording images of a color tone that is suited to a drive recorder.

A driver assistance system of a first aspect is a driver assistance system including: a periphery monitoring device that includes an imaging section that is mounted at a vehicle and captures images of a vehicle periphery, a color tone correction processing section that corrects color tone of an image captured by the imaging section, and a display portion that displays an image having color tone that has been corrected by the color tone correction processing section, a drive recorder that includes the imaging section, the color tone correction processing section, and a recording section that records an image having color tone that has been corrected by the color tone correction processing section; and an illuminance detecting section that detects illuminance in an imaging direction of the imaging section, wherein the color tone correction processing section is set such that, in a case in which an illuminance that is detected by the illuminance detecting section at a time of imaging by the imaging section is less than a predetermined reference value, color tone correction that is executed for recording in the recording section is color tone correction that is dark as compared with color tone correction that is executed for display at the display portion, and the color tone correction processing section is set such that, in a case in which the illuminance that is detected by the illuminance detecting section at the time of imaging by the imaging section is greater than or equal to the predetermined reference value, color tone correction that is executed for recording in the recording section is color tone correction that is bright as compared with color tone correction that is executed for display at the display portion.

In accordance with the above-described structure, the periphery monitoring device, by the color tone correction processing section, corrects the color tone of an image of the vehicle periphery that is captured by the imaging section, and displays, on the display portion, the image having color tone that has been corrected by the color tone correction processing section. In contrast, the drive recorder, by the color tone correction processing section, corrects the color tone of an image of the vehicle periphery that is captured by the imaging section, and records, in the recording section, the image having color tone that has been corrected by the color tone correction processing section. Further, illuminance in the imaging direction of the imaging section is detected by the illuminance detecting section.

Here, the color tone correction processing section is set such that, in a case in which the illuminance that is detected by the illuminance detecting section at a time of imaging by the imaging section is less than a predetermined reference value, the color tone correction that is executed for recording in the recording section is color tone correction that is dark as compared with the color tone correction that is executed for display at the display portion, and the color tone correction processing section corrects the color tone in accordance with this setting. Further, the color tone correction processing section is set such that, in a case in which the illuminance that is detected by the illuminance detecting section at the time of imaging by the imaging section is greater than or equal to the predetermined reference value, the color tone correction that is executed for recording in the recording section is color tone correction that is bright as compared with the color tone correction that is executed for display at the display portion, and the color tone correction processing section corrects the color tone in accordance with this setting.

In a driver assistance system of a second aspect, in the first aspect, in a case in which an image having color tone that has been corrected by the color tone correction processing section is to be displayed at the display portion, the color tone correction processing section executes color tone correction for display at the display portion, and, in a case that is other than the case in which an image having color tone that has been corrected by the color tone correction processing section is to be displayed at the display portion, and is a case in which an image is being captured by the imaging section, the color tone correction processing section executes color tone correction for recording in the recording section, and the recording section records the image having color tone that has been corrected.

In accordance with the above-described structure, in a case in which an image having color tone that has been corrected by the color tone correction processing section is to be displayed at the display portion, the color tone correction processing section executes color tone correction for display at the display portion. In contrast, in a case that is other than the case in which an image having color tone that has been corrected by the color tone correction processing section is to be displayed at the display portion, and is a case in which an image is being captured by the imaging section, the color tone correction processing section executes color tone correction for recording in the recording section, and the recording section records the image having color tone that has been corrected. Due thereto, an image that is not to be displayed at the display portion is utilized effectively.

As described above, the driver assistance system of the present disclosure has the excellent effect of, by using images that are captured by a common imaging section, being able to achieve both of two functions that are the function of displaying images of a color tone that is suitable for monitoring the periphery of a vehicle, and the function of recording images of a color tone that is suited to a drive recorder.

BRIEF DESCRIPTION OF THE DRAWINGS

Exemplary embodiments of the present invention will be described in detail based on the following figures, wherein.

DETAILED DESCRIPTION

First Embodiment

Figure 1:
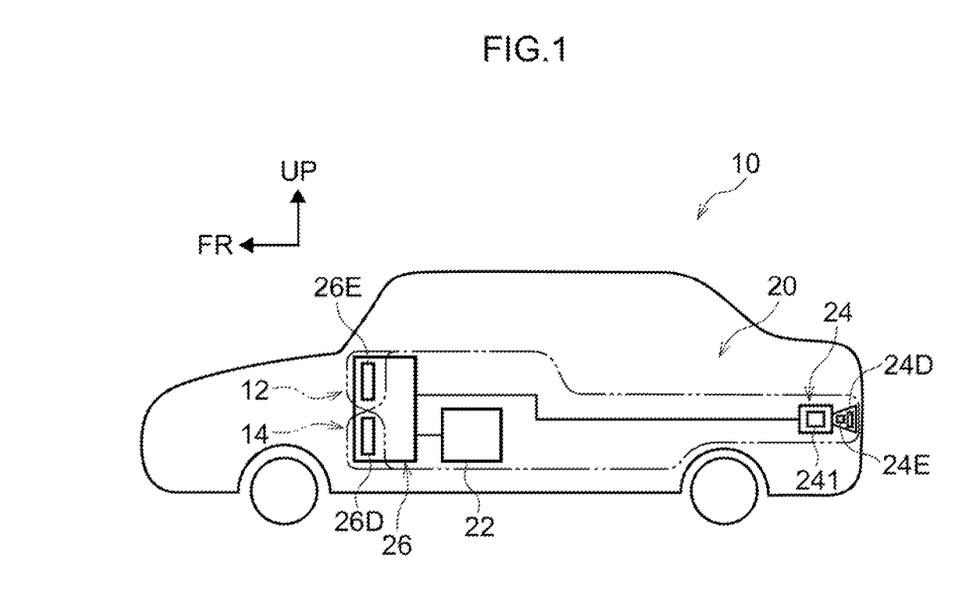
FIG. 1 is a drawing that schematically shows the schematic structure of a driver assistance system relating to a first embodiment, in a state of being mounted at a vehicle.

A driver assistance system relating to a first embodiment of the present disclosure is described by using FIG. 1 through FIG. 8. Note that arrow FR that is shown in FIG. 1 indicates the vehicle front side, and arrow UP indicates the vehicle upper side.

The schematic structure of a driver assistance system 20 relating to the first embodiment is shown schematically in FIG. 1 in a state of being mounted at a vehicle. As shown in, the driver assistance system 20 is mounted at a vehicle 10, and, as an example, is configured to include a vehicle information acquiring section 22, a rear camera device 24 and a multimedia device 26.

The vehicle information acquiring section 22 acquires information relating to operational states and traveling states of the vehicle 10. Information, which relates to the respective operational states of switches (not illustrated) and a shift lever (not illustrated) that are within the vehicle cabin, is included in the information relating to the operational states of the vehicle 10. The rear camera device 24 is configured to include an imaging section 24D that is mounted at the rear portion of the vehicle 10 and that captures images of the rear (the vehicle periphery) of the vehicle 10, and a color tone correction processing section 241 (details described later) that corrects the color tone of images captured by the imaging section 24D. The multimedia device 26 is configured to include a monitor 26E, which serves as a display portion and displays images whose color tone has been corrected by the color tone correction processing section 241, and a storage 26D that serves as a memory and a recording section and in which the images whose color tone has been corrected by the color tone correction processing section 241 are recorded.

A periphery monitoring device 12 is configured to include the above-described imaging section 24D, color tone correction processing section 241 and monitor 26E. Further, a drive recorder 14 is configured to include the above-described imaging, section 24D, color tone correction processing section 241 and storage 26D.

Note that the periphery monitoring device 12 of the present embodiment has a back guiding monitor system that uses the rear camera device 24 and the monitor 26E. The back guiding monitor system operates when the shift lever (not illustrated) is set in the R range. Further, the rear camera device 24 is configured so as to be able to receive predetermined vehicle display information by CAN (Controller Area Network) communication, in order for virtual guidelines (not illustrated) for guiding rearward travel to be able to be displayed at the monitor 26E.

Figure 2:
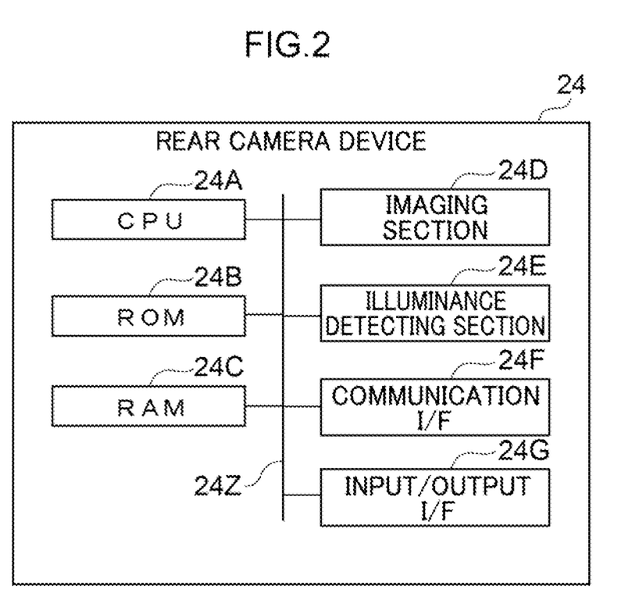
FIG. 2 is a block drawing showing an example of hardware structures of a rear camera device.

An example of the hardware structures of the rear camera device 24 is shown in a block drawing in FIG. 2.

As shown in FIG. 2, the rear camera device 24 is configured to include a CPU (Central Processing Unit) 24A that serves as a processor, a ROM (Read Only Memory) 24B that serves as a memory, a RAM (Random Access Memory) 24C, the imaging section 24D, an illuminance detection section 24E, a communication I/F (Inter Face) 24F and an input/output I/F 24G. The CPU 24A, the ROM 24B, the RAM 24C, the imaging section 24D the illuminance detecting section 24E, the communication I/F 24F and the input/output I/F 24G are coupled so as to be able to communicate with one another via a bus 24Z.

The CPU 24A is a central computing processing unit, and executes various programs and controls the respective sections. Namely, the CPU 24A reads-out programs (including a color tone correction program that is described later) from the ROM 24B and executes the programs by using the RAM 24C as a workspace. The CPU 24A carries out control of the above-described respective structures and various computing processings in accordance with programs that the ROM 24B has stored.

The ROM 24B stores various programs and various data. The color tone correction program, which is for correcting the color tone of images captured by the imaging section 24D, and the like are stored in the ROM 24B. Further, a table for gamma correction, which is referred to at the time of execution of the color tone correction program, is stored in the ROM 24B. The RAM 24C temporarily stores programs or records data as a workspace.

A CCD (Charge Coupled Device) image sensor for example is used as the imaging section 24D. Note that another imaging element such as a CMOS (Complementary Metal Oxide Semiconductor) or the like may be used instead of a CCD image sensor. The illuminance detecting section 24E is a sensor (an illuminance sensor) that detects the illuminance in the imaging direction of the imaging section 24D.

The communication I/F 24F is an interface for the rear camera device 24 to communicate with other devices. Wireless communication standards such as, for example, 4G, 5G, WiFi® or the like are used for this communication. The input/output I/F 24G is an interface for communication with respective devices that are mounted at the vehicle 10. As an example, the multimedia device 26 (see FIG. 1) is coupled to the rear camera device 24 of the present embodiment via the input/output I/F 24G. Note that the multimedia device 26 may be directly coupled to the bus 24Z.

Figure 3:
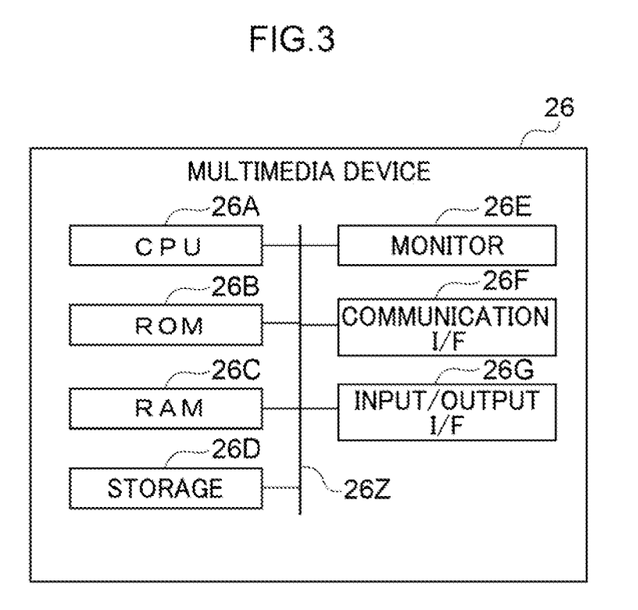
FIG. 3 is a block drawing showing an example of hardware structures of a multimedia device.

An example of the hardware structures of the multimedia device 26 is shown in a block drawing in FIG. 3.

As shown in FIG. 3, the multimedia device 26 is configured to include a CPU 26A that serves as a processor, a ROM 26B that serves as a memory, a RAM 26C, the storage 26D that serves as a memory and a recording section, the monitor 26E, a communication I/F 26F and an input/output I/F 26G. The CPU 26A, the ROM 26B, the RAM 26C, the storage 26D, the monitor 26E, the communication I/F 26F and the input/output I/F 26G are coupled so as to be able to communicate with one another via a bus 26Z.

The CPU 26A is a central computing processing unit, and executes various programs and controls the respective sections. Namely, the CPU 26A reads-out programs (including a display judging program and a recording control program that are described later) from the ROM 26B or the storage 26D, and executes the programs by using the RAM 26C as a workspace. The CPU 26A carries out control of the above-described respective structures and various computing processings in accordance with programs that the ROM 26B has stored.

The ROM 26B stores various programs and various data. In the present embodiment, the display judging program, which is for judging the necessity of rear image display at the monitor 26E, and the recording control program, which is for controlling recording in the storage 26D, and the like are stored in the ROM 26B. The RAM 26C temporarily memorizes programs or records data as a workspace. The storage 26D is configured by an HDD (Hard Disk Drive) or an SSD (Solid State Drive), and stores various programs including the operating system, and various data. In the present embodiment, images of the periphery of the vehicle are recorded in the storage 26D. Further, the monitor 26E is disposed at the front portion of the vehicle cabin interior, and displays images of the vehicle periphery, and the like.

The communication I/F 26F is an interface for the multimedia device 26 to communicate with other devices. Wireless communication standards such as, for example, 4G, 5G, WiFi® or the like are used for this communication. The input/output I/F 26G is an interface for communication with respective devices that are mounted at the vehicle 10. As an example, the vehicle information acquiring section 22 and the rear camera device 24 (refer to FIG. 1 for both) are coupled to the multimedia device 26 of the present embodiment via the input/output I/F 26G. Note that the vehicle information acquiring section 22 and the rear camera device 24 may be directly coupled to the bus 26Z.

The functional structure of the rear camera device 24 that is shown in FIG. 1 and FIG. 2 is described next. The rear camera device 24 has, as the functional structure thereof, the color tone correction processing section 241 that is shown in FIG. 1. The color tone correction processing section 241 is realized by the CPU 24A reading-out and executing the color tone correction program that has been stored in the ROM 24B.

The color tone correction processing section 241 is set such that, in a case in which the illuminance that is detected by the illuminance detecting section 24E at the time of imaging by the imaging section 24D is less than a predetermined reference value, the color tone correction that is executed for recording in the storage 26D is dark color tone correction as compared with the color tone correction that is executed for display at the monitor 26E. Further, the color tone correction processing section 241 is set such that, in a case in which illuminance that is detected by the illuminance detecting section 24E at the time of imaging by the imaging section 24D is greater than or equal to the aforementioned predetermined reference value, the color tone correction that is executed for recording in the storage 26D is bright color tone correction as compared with the color tone correction that is executed for display at the monitor 26E.

Further, in a case in which the image having color tone that is corrected by the color tone correction processing section 241 is to be displayed at the monitor 26E, the color tone correction processing section 241 executes the aforementioned color tone correction for display at the monitor 26E. In a case that is other than a case in which the image having color tone that is corrected by the color tone correction processing section 241 is to be displayed at the monitor 26E, and is a case in which an image is being captured by the imaging section 24D, the color tone correction processing section 241 executes color tone correction for recording in the storage 26D, and the image having color tone that has been corrected is recorded in the storage 26D.

Figure 4:
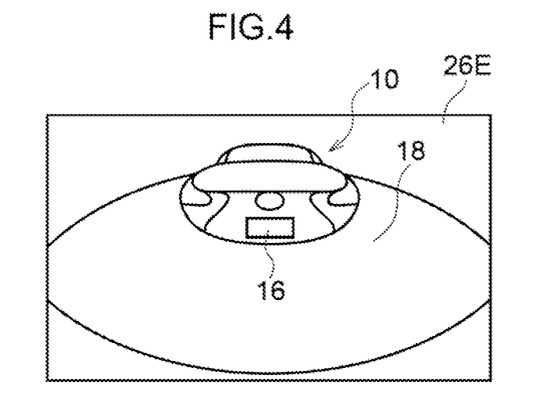
FIG. 4 is a drawing schematically showing an example of an image displayed at a monitor.
Figure 5:
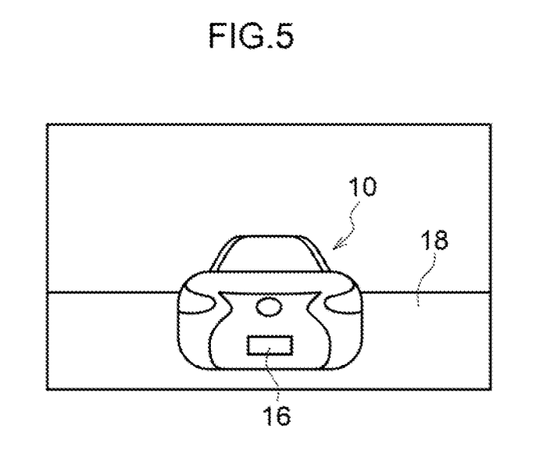
FIG. 5 is a drawing schematically showing an example of an image recorded in a storage.
Figure 6:
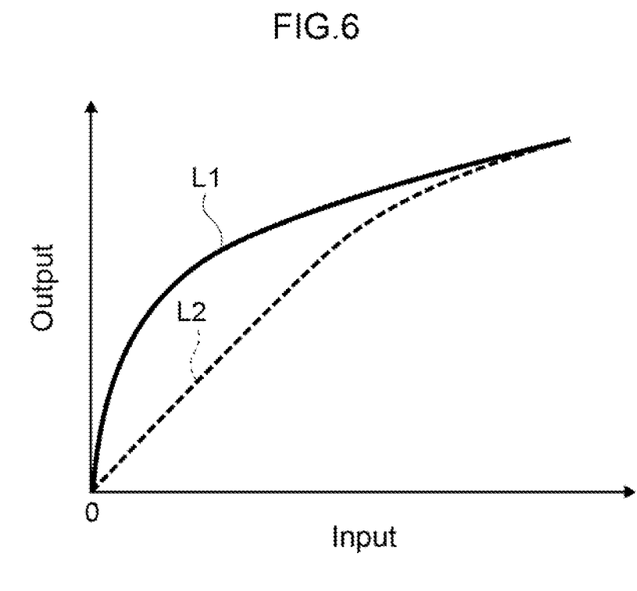
FIG. 6 is a graph for explaining color tone correction processing for nighttime.
Figure 7:
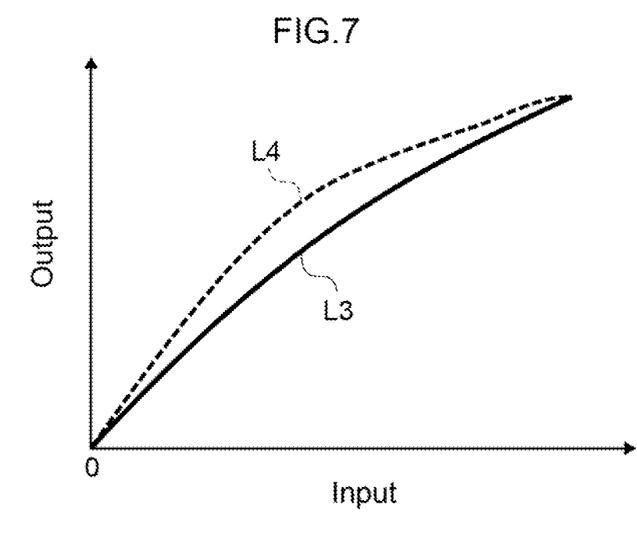
FIG. 7 is a graph for explaining color tone correction processing for daytime.

The color tone correction by the color tone correction processing section 241 is described here with reference to FIG. 4 through FIG. 7. An example of an image that is displayed at the monitor 26E (an image for viewing several meters rearward of the vehicle 10) is shown in a schematic drawing in FIG. 4. An example of an image that is recorded in the storage 26D (an image for confirming a license plate (number plate) 16 or the like) is shown in a schematic drawing in FIG. 5. Note that, although not illustrated, in the images that are recorded in the storage 26D, the colors of traffic signals and the like are also important objects to be confirmed. On the other hand, a graph for explaining color tone correction processing for nighttime is shown in FIG. 6, and a graph for explaining color tone correction processing for daytime is shown in FIG. 7. Note that, in the present embodiment, gamma correcting processing is used as the color tone correction processing, and, in FIG. 6, the pixel values before gamma correction are on the horizontal axis, and the pixel values after gamma correction are on the vertical axis.

The gamma curves that are shown in FIG. 6 and FIG. 7 (i.e., curves expressing the relationships between the pixel values before gamma correction and the pixel values after gamma correction) are determined in accordance with the brightness of the viewed object and the brightness of the periphery thereof. Therefore, gamma curves for daytime use and for nighttime use are provided.

A road surface 18, which desirably is displayed clearly on the monitor 26E shown in FIG. 4, is darker than the periphery at night, and is of a similar brightness as the periphery during the daytime. The gamma correction values in the correction for displaying are set on the basis of this point. Further, the license plate 16, which is shown in FIG. 5 and which desirably is shown clearly in an image recorded in the storage 26D, is blighter than the periphery at night, and, during the day, is darker than the periphery in a case in which it is a shadowed portion of the vehicle 10. The gamma correction values in the correction for recording are set on the basis of this point.

The correction for nighttime and for display is, as an example, set as shown by solid line L1 in FIG. 6 in order for the road surface 18 that is shown in FIG. 4 to be shown clearly. The correction for nighttime and for recording is, as an example, set as shown by dashed line L2 in FIG. 6 in order for the license plate 16 that is shown in FIG. 5 to be shown clearly. The correction for daytime and for display is, as an example, set as shown by solid line L3 of FIG. 7 in order for the road surface 18 that is shown in FIG. 4 to be shown clearly. The correction for daytime and for recording is, as an example, set as shown by dashed line L4 in FIG. 7 in order for the license plate 16 that is shown in FIG. 5 to be shown clearly.

Next, an example of the functions of the multimedia device 26 that is shown in FIG. 1 and FIG. 3 is described summarily. At the multimedia device 26, due to the CPU 26A reading-out and executing the display judging program that has been stored in the ROM 26B, the necessity of rear image display at the monitor 26E is judged on the basis of information from the vehicle information acquiring section 22. Further, at the multimedia device 26, due to the CPU 26A reading-out and executing the recording control program that has been stored in the ROM 26B, recording in the storage 26D is controlled.

Operation of the driver assistance system 20 is described next.

When information (signals) are inputted to the multimedia device 26 from the vehicle information acquiring section 22 shown in FIG. 1, the multimedia device 26 judges the necessity of rear image display at the monitor 26E, and transmits the results of this judgment to the rear camera device 24. On the basis of the judgment results from the multimedia device 26 and the information detected by the illuminance detecting section 24E, the rear camera device 24 executes color tone correction processing.

Figure 8:
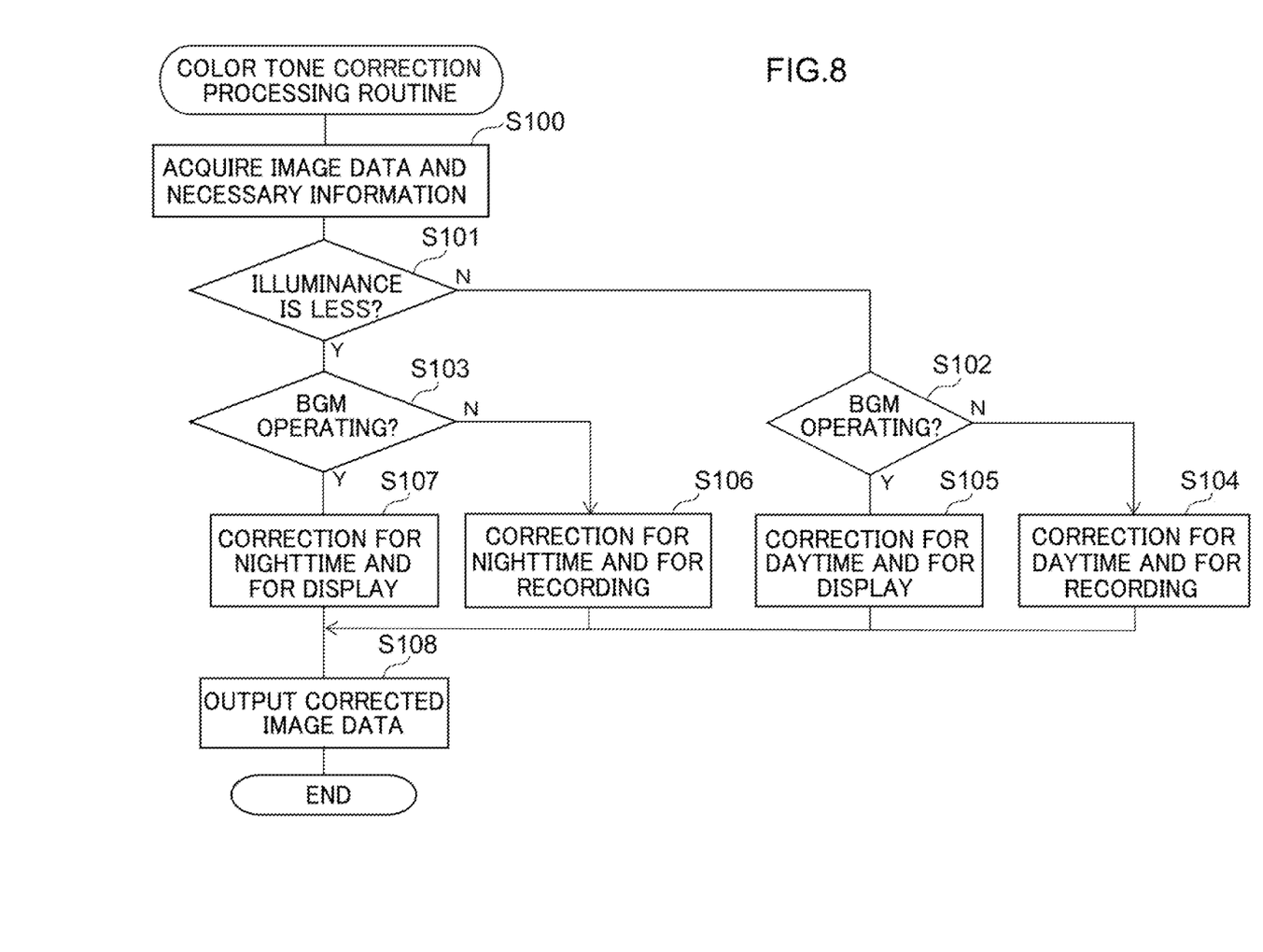
FIG. 8 is a flowchart showing an example of the flow of color tone correction processing by the rear camera device.

An example of the flow of the color tone correction processing by the rear camera device 24 is shown in a flowchart in FIG. 8. The color tone correction processing by the rear camera device 24 is carried out due to the CPU 24A reading-out the color tone correction program that has been stored in the ROM 24B, and expanding and executing the color tone correction program in the RAM 24C. Note that the color tone correction processing routine that is shown in FIG. 8 is executed repeatedly, for example, during the time while the ignition switch is on.

The CPU 24A acquires image data from the imaging section 24D (step S100). Further, the CPU 24A acquires information that is needed at the time of carrying out color tone correction. Namely, the CPU 24A acquires information of the illuminance in the imaging direction of the imaging section 24D from the illuminance detecting section 24E, and acquires information relating to the necessity of rear image display at the monitor 26E from the multimedia device 26 (step S100).

Next, the CPU 24A judges whether or not the illuminance acquired in step S100 is less than a predetermined reference value (step S101). Here, the predetermined reference value is set by using, as the reference therefor, whether or not it can be understood that the illuminance is a daytime illuminance. If the illuminance is greater than or equal to the predetermined reference value (step S101: N), the CPU 24A moves on to the processing of step S102. If the illuminance is less than the predetermined reference value (step S101: Y), the CPU 24A moves on to the processing of step S103.

In step S102, the CPU 24A judges the absence/presence of operation of a hack guiding monitor system (abbreviated as "BGM" in FIG. 8) (i.e., judges the necessity of rear image display at the monitor 26E). If it is judged in step S102 that the back guiding monitor system is not operating (i.e., that rear image display at the monitor 26E is unnecessary) (step S102: N), the CPU 24A executes color tone correction for daytime and for recording (refer to the gamma curve of dashed line L4 in FIG. 7) on the image captured by the imaging section 24D (step S104), and moves on to the processing of step S108. If it is judged in step S102 that the back guiding monitor system is operating (i.e., that rear image display at the monitor 26E is necessary) (step S102: Y), the CPU 24A executes color tone correction for daytime and for display (refer to the gamma curve of solid line L3 in FIG. 7) on the image captured by the imaging section 24D (step S105), and moves on to the processing of step S108.

In step S103, the CPU 24A judges the absence/presence of operation of the back guiding monitor system (BGM) (i.e., judges the necessity of rear image display at the monitor 26E). If it is judged in step S103 that the back guiding monitor system is not operating (i.e., that rear image display at the monitor 26E is unnecessary) (step S103: N), the CPU 24A executes color tone correction for nighttime and for recording (refer to the gamma curve of dashed line L2 in FIG. 6) on the image captured by the imaging section 24D (step S106), and moves on to the processing of step S108. If it is judged in step S103 that the back guiding monitor system is operating (i.e., that rear image display at the monitor 26E is necessary) (step S103: Y), the CPU 24A executes color tone correction for nighttime and for display (refer to the gamma curve of solid line L1 in FIG. 6) on the image captured by the imaging section 24D (step S107), and moves on to the processing of step S108.

In step S108, the CPU 24A outputs the corrected image data to the multimedia device 26, and ends the color tone correction processing.

If the corrected image data is image data for display, the multimedia device 26 shown in FIG. 1 displays the corrected image data on the monitor 26E. If the corrected image data is image data for recording, the multimedia device 26 records the corrected image data in the storage 26D. Due thereto, images that are not to be displayed at the monitor 26E are used effectively.

As described above, in accordance with the driver assistance system 20 of the present embodiment, by using images captured by the common imaging section 24D, both of the two functions that are the function of displaying images of a color tone that is suitable for monitoring the periphery of the vehicle 10, and the function of recording images of a color tone that is suited to use for the drive recorder 14, can be achieved.

Further, in the present embodiment, because the number of the imaging sections 24D can be kept down, the present embodiment is advantageous also with regard to the points of improving the design and lowering costs.

Second Embodiment

A driver assistance system 30 relating to a second embodiment of the present disclosure is described next by using FIG. 9. The schematic structure of the driver assistance system 10 relating to the second embodiment is shown schematically in FIG. 9 in a state of being mounted at a vehicle. As shown in this drawing, the driver assistance system 30 relating to the second embodiment differs from the driver assistance system 20 relating to the first embodiment (see FIG. 1) with regard to the point that the rear camera device 24 is configured so as to be able to acquire information from the vehicle information acquiring section 22. The other structures are structures that are substantially similar to those of the first embodiment. Accordingly, the structural portions that are substantially similar to those of the first embodiment are denoted by the same reference numerals, and description thereof is omitted.

Note that, because signals from the vehicle information acquiring section 22 (including the R shift signal that expresses that the shift lever is in the R range) are outputted on the CAN, the structure of the present embodiment can be established by employing a structure that can receive signals from the vehicle information acquiring section 22 by CAN communication at the rear camera device 24. Further, in the present embodiment, the display judging program for judging the necessity of rear image display at the monitor 26E is not stored in the ROM 26B (refer to FIG. 3) of the multimedia device 26 shown in FIG. 9.

In the present embodiment, at the rear camera device 24, in a case in which it is judged, on the basis of information from the vehicle information acquiring section 22, that operation to set the shift lever in the R range has been carried out, in step S102 and step S103 of the flowchart of FIG. 8, it is judged that the back guiding monitor system is operating (i.e., that rear image display at the monitor 26E is needed).

Figure 9:
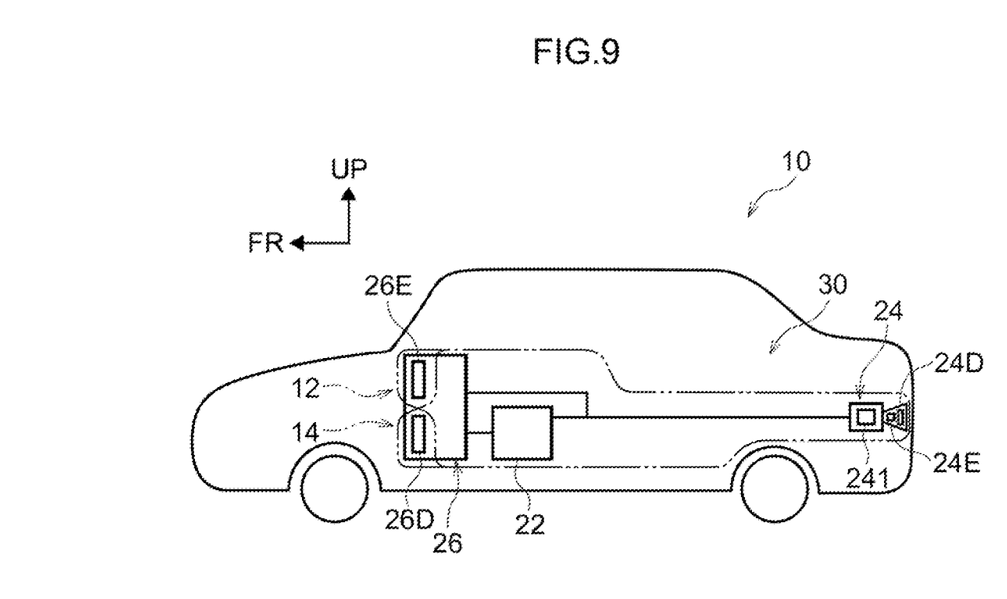
FIG. 9 is a drawing that schematically shows the schematic structure of a driver assistance system relating to a second embodiment, in a state of being mounted at a vehicle.

Namely, in the present embodiment, on the basis of information from the vehicle information acquiring section 22, the multimedia device 26 that is shown in FIG. 9 judges the necessity of rear image display at the monitor 26E, and the processing of transmitting the results of that judgment to the rear camera device 24 can be omitted. Due thereto, the time period from the time when the shift lever is set in the R range to the time that the image is displayed at the monitor 26E is shortened, and the display wait time for the vehicle occupant can be shortened.

Third Embodiment

A driver assistance system 40 relating to a third embodiment of the present disclosure is described next by using FIG. 10 and FIG. 11. The schematic structure of the driver assistance system 40 relating to the third embodiment is shown schematically in FIG. 10 in a state of being mounted at a vehicle. As shown in this drawing, the driver assistance system 40 relating to the third embodiment differs from the driver assistance system 20 relating to the first embodiment (see FIG. 1) with regard to the point that a front camera device 42 and a panoramic view monitor ECU (Electrical Control Unit) 44 (hereinafter abbreviated as "PVM ECU 44") are provided. The other structures are structures that are substantially similar to those of the first embodiment unless otherwise noted hereinafter. Accordingly, the structural portions that are substantially similar to those of the first embodiment are denoted by the same reference numerals, and description thereof is omitted.

The front camera device 42 is configured to include an imaging section 42D that is mounted at the upper portion of the vehicle cabin interior of the vehicle 10 and captures images of the front of the vehicle 10 (the vehicle periphery) and a color tone correction processing section 421 that corrects the color tone of images captured by the imaging section 42D. Further, the front camera device 42 has an illuminance detecting section 42E that detects the illuminance in the direction of imaging of the imaging section 42D.

The placed position and the imaging direction of the front camera device 42 differ from those of the rear camera device 24, but, with regard to other points, the front camera device 42 is a camera device that is similar to the rear camera device 24. The imaging section 42D of the front camera device 42 is configured similarly to the imaging section 24D of the rear camera device 24, and the color tone correction processing section 421 of the front camera device 42 is configured similarly to the color tone correction processing section 241 of the rear camera device 24. Further, the illuminance detecting section 42E of the front camera device 42 is configured similarly to the illuminance detecting section 24E of the rear camera device 24.

In the present embodiment, a periphery monitoring device 12A is configured to include the imaging sections 24D, 42D, the color tone correction processing sections 241, 421, and the monitor 26E. Further, a drive recorder 14A is configured to include the imaging sections 24D, 42D, the color tone correction processing sections 241, 421, and the storage 26D. Note that the periphery monitoring device 12A of the present embodiment has, instead of the back guiding monitor system of the first embodiment, a panoramic view monitoring system that uses the rear camera device 24, the front camera device 42, the PVM ECU 44 and the monitor 26E. The panoramic view monitoring system operates when the shift lever (not illustrated) is set in the R range. Further, in the present embodiment, as an example, the vehicle information acquiring section 22 and the multimedia device 26 are not coupled directly.

Figure 11:
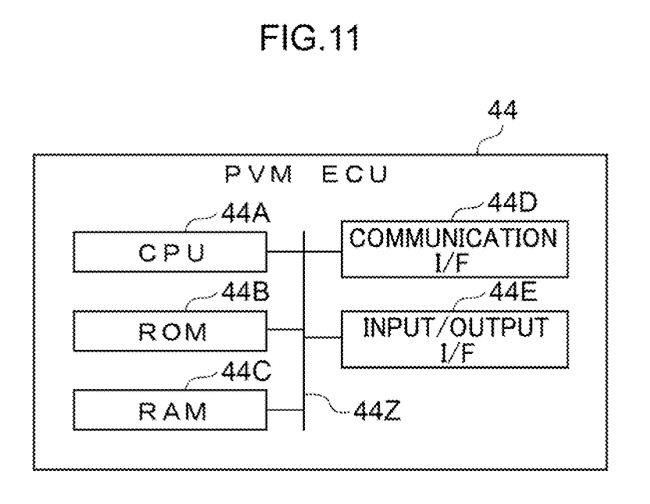
FIG. 11 is a block drawing showing an example of hardware structures of a panoramic view monitor ECU (PVM ECU).

An example of the hardware structures of the PVM ECU 44 are shown in a block drawing in FIG. 11.

As shown in FIG. 11, the PVM ECU 44 is configured to include a CPU 44A that serves as a processor, a ROM 44B that serves as a memory, a RAM 44C, a communication I/F 44D and an input/output I/F 44E. The CPU 44A, the ROM 44B, the RAM 44C, the communication I/F 44D and the input/output 44E are coupled so as to be able to communicate with one another via a bus 44Z.

The CPU 44A is a central computing processing unit, and executes various programs and controls the respective sections. Namely, the CPU 44A reads-out programs (including a display judging program that is described later) from the ROM 44B, and executes the programs by using the RAM 44C as a workspace. The CPU 44A carries out control of the above-described respective structures and various computing processings in accordance with programs that have been stored in the ROM 44B.

The ROM 44B stores various programs and various data. In the present embodiment, a display judging program for judging the necessity of panoramic view display at the monitor 26E (see FIG. 10), and the like are stored in the ROM 44B. Note that, in the present embodiment, the display judging program is not stored in the ROM 26B (see FIG. 3) of the multimedia device 26 shown in FIG. 10. The RAM 44C shown in FIG. 11 temporarily stores programs or records data as a workspace.

The communication I/F 44D is an interface for the PVM ECU 44 to communicate with other devices. Wireless communication standards such as, for example, 4G, 5G, WiFi® or the like are used for this communication. The input/output I/F 44E is an interface for communication with respective devices that are mounted at the vehicle 10. As an example, the vehicle information acquiring section 22, the rear camera device 24, the front camera device 42 and the multimedia device 26 (refer to FIG. 10 for all of these) are coupled to the PVM ECU 44 of the present embodiment via the input/output I/F 44E. Note that the vehicle information acquiring section 22, the rear camera device 24, the front camera device 42 and the multimedia device 26 may be directly coupled to the bus 44Z.

Figure 10:
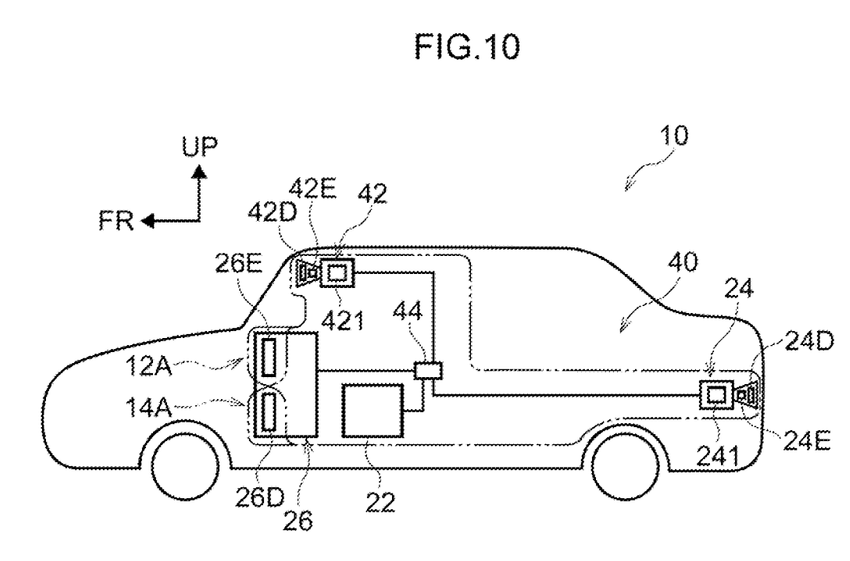
FIG. 10 is a drawing that schematically shows the schematic structure of a driver assistance system relating to a third embodiment, in a state of being mounted at a vehicle.

Next, an example of the functions of the PVM ECU 44 that is shown in FIG. 10 and FIG. 11 is described summarily. At the PVM ECU 44, due to the CPU 44A reading-out and executing the display judging program that the ROM 44B has stored, the necessity of panoramic view display at the monitor 26E is judged on the basis of information from the vehicle information acquiring section 22. Further, at the PVM ECU 44, due to the CPU 44A reading-out and executing an image generating program that the ROM 44B has stored, the corrected image acquired from the front camera device 42 and the corrected image acquired from the rear camera device 24 are combined, and a panoramic view image (hereinafter abbreviated as "PVM image") is generated.

Operation of the driver assistance system 40 is described next.

When information (signals) are inputted to the PVM ECU 44 from the vehicle information acquiring section 22 shown in FIG. 10, the PVM ECU 44 judges the necessary of panoramic view display at the monitor 26E. Then, the PVM ECU 44 transmits the results of the judgement on the necessity of panoramic view display at the monitor 26E to the rear camera device 24 and the front camera device 42. On the basis of the results of judgment from the PVM ECU 44 and the information detected by the illuminance detecting sections 24E, 42E, the rear camera device 24 and the front camera device 42 respectively execute color tone correction processing, and respectively output corrected images to the PVM ECU 44. Note that the color tone converting processing in the present embodiment differs from the first embodiment with regard to the point that absence/presence of operation of the panoramic view monitoring system (i.e., the necessity of panoramic view display at the monitor 26E) is judged, instead of the judging of the absence/presence of operation of the back guiding monitor system (BGM) in steps S102, S103 of FIG. 8 in the first embodiment. However, other steps are executed similarly to those of the flow of FIG. 8 in the first embodiment.

In a case in which it is judged that panoramic view display is necessary, the PVM ECU 44 shown in FIG. 10 generates a PVM image in which the corrected image acquired from the front camera device 42 and the corrected image acquired from the rear camera device 24 are combined into a single image, and transmits the PVM image to the multimedia device 26. In other cases, the PVM ECU 44 transmits the respective corrected images to the multimedia device 26. In a case in which panoramic view display is necessary, the multimedia device 26 displays the PVM image acquired from the PVM ECU 44 on the monitor 26E. In other cases, the multimedia device 46 records the respective corrected images that have been acquired from the PVM ECU 44 in the storage 26D.

In accordance with the present embodiment as well, by using images captured by the common imaging sections 24D, 42D, both of the two functions that are the function of displaying images of a color tone that is suitable for monitoring the periphery of the vehicle 10, and the function of recording images of a color tone that is suited to use for the drive recorder 14A, can be achieved.

Supplementary Description of Embodiments

Note that any of various types of processors other than a CPU may execute the respective processings that are executed by the CPUs 24A, 26A, 44A shown in FIG. 2, FIG. 3 and FIG. 11 reading-out software (programs) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the respective processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Further, the respective programs in the above-described embodiments may be provided in forms of being stored on a non-transitory storage medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device via a network.

Further, as a modified example of the above-described first embodiment, there may be a structure in which, in a case that is other than a case in which the image having color tone that has been corrected by the color tone correction processing section 241 is to be displayed at the monitor 26E, and is a case in which an image is being captured by the imaging section 24D, and, moreover, an abnormal state such as sudden braking or the like is sensed by an acceleration sensor or the like, the color tone correction processing section 241 executes color tone correction for recording in the storage 26D, and the storage 26D records the image having color tone that has been corrected.

Note that the above-described embodiments and the above-described modified example may be implemented by being combined appropriately.

Although examples of the present disclosure have been described above, the present disclosure is not limited to the above, and, of course, can be implemented by being modified in various ways other than the above within a scope that does not depart from the gist thereof.

What is claimed is:

1. A driver assistance system comprising:
   a periphery monitoring device that includes an imaging section that is mounted at a vehicle and captures images of a vehicle periphery, a memory, a processor that is coupled to the memory and that serves as a color tone correction processing section that corrects color tone of an image captured by the imaging section, and a display portion that displays an image having color tone that has been corrected by the color tone correction processing section;
   a drive recorder that includes the imaging section, the memory, the processor that serves as the color tone correction processing section, and a recording section that records the image having color tone that has been corrected by the color tone correction processing section; and
   an illuminance detecting section that detects illuminance in an imaging direction of the imaging section,
   wherein the processor is configured to:

in a case in which an illuminance that is detected by the illuminance detecting section at a time of imaging by the imaging section is less than a predetermined reference value, correct color tone of an image captured by the imaging section such that color tone correction that is executed for recording in the recording section is color tone correction that is dark as compared with color tone correction that is executed for display at the display portion, and in a case in which the illuminance that is detected by the illuminance detecting section at the time of imaging by the imaging section is greater than or equal to the predetermined reference value, correct the color tone of the image captured by the imaging section such that color tone correction that is executed for recording in the recording section is color tone correction that is bright as compared with color tone correction that is executed for display at the display portion.

2. The driver assistance system of claim 1, wherein the processor is configured so as to:

in a case in which the image having color tone that has been corrected is to be displayed at the display portion, execute color tone correction for display at the display portion, and in a case that is other than the case in which the image having color tone that has been corrected by the color tone correction processing section is to be displayed at the display portion, and is a case in which an image is being captured by the imaging section, execute color tone correction for recording in the recording section, and record, in the recording section, the image having color tone that has been corrected.

3. A driver assisting method in a driver assistance system that includes:

a periphery monitoring device that includes an imaging section that is mounted at a vehicle and captures images of a vehicle periphery, a memory, a processor that is coupled to the memory and that serves as a color tone correction processing section that corrects color tone of an image captured by the imaging section, and a display portion that displays an image having color tone that has been corrected by the color tone correction processing section;

a drive recorder that includes the imaging section, the memory, the processor that serves as the color tone correction processing section, and a recording section that records the image having color tone that has been corrected by the color tone correction processing section; and an illuminance detecting section that detects illuminance in an imaging direction of the imaging section, the method comprising, by a processor:

in a case in which an illuminance that is detected by the illuminance detecting section at a time of imaging by the imaging section is less than a predetermined reference value, correcting color tone of an image captured by the imaging section such that color tone correction that is executed for recording in the recording section is color tone correction that is dark as compared with color tone correction that is executed for display at the display portion, and in a case in which the illuminance that is detected by the illuminance detecting section at the time of imaging by the imaging section is greater than or equal to the predetermined reference value, correcting color tone of the image captured by the imaging section such that color tone correction that is executed for recording in the recording section is color tone correction that is bright as compared with color tone correction that is executed for display at the display portion.

4. The driver assisting method of claim 3, wherein:

in a case in which the image having color tone that has been corrected is to be displayed at the display portion, the processor executes color tone correction for display at the display portion, and in a case that is other than the case in which the image having color tone that has been corrected by the color tone correction processing section is to be displayed at the display portion, and is a case in which an image is being captured by the imaging section, the processor executes color tone correction for recording in the recording section, and records, in the recording section, the image having color tone that has been corrected.

5. A non-transitory storage medium storing a program executable by a processor to perform driver assisting processing in a driver assistance system that includes:

a periphery monitoring device that includes an imaging section that is mounted at a vehicle and captures images of a vehicle periphery, a memory, a processor that is coupled to the memory and that serves as a color tone correction processing section that corrects color tone of an image captured by the imaging section, and a display portion that displays an image having color tone that has been corrected by the color tone correction processing section;

a drive recorder that includes the imaging section, the memory, the processor that serves as the color tone correction processing section, and a recording section that records the image having color tone that has been corrected by the color tone correction processing section; and an illuminance detecting section that detects illuminance in an imaging direction of the imaging section, the driver assisting processing including:

in a case in which an illuminance that is detected by the illuminance detecting section at a time of imaging by the imaging section is less than a predetermined reference value, correcting color tone of an image captured by the imaging section such that color tone correction that is executed for recording in the recording section is color tone correction that is dark as compared with color tone correction that is executed for display at the display portion, and in a case in which the illuminance that is detected by the illuminance detecting section at the time of imaging by the imaging section is greater than or equal to the predetermined reference value, correcting the color tone of the image captured by the imaging section such that color tone correction that is executed for recording in the recording section is color tone correction that is bright as compared with color tone correction that is executed for display at the display portion.

6. The non-transitory storage medium of claim 5 storing the program executable by a processor to perform driver assisting processing including:

in a case in which the image having color tone that has been corrected is to be displayed at the display portion, executing color tone correction for display at the display portion, and in a case that is other than the case in which the image having color tone that has been corrected by the color tone correction processing section is to be displayed at the display portion, and is a case in which an image is being captured by the imaging section, executing color tone correction for recording, in the recording section, and recording, in the recording section, the image having color tone that has been corrected.

* * * * *